Nov. 28, 1933. E. PICK 1,937,326
INTERMITTENT GEAR DRIVE AND MEANS OF CONTROLLING SAME
Filed Aug. 21, 1931
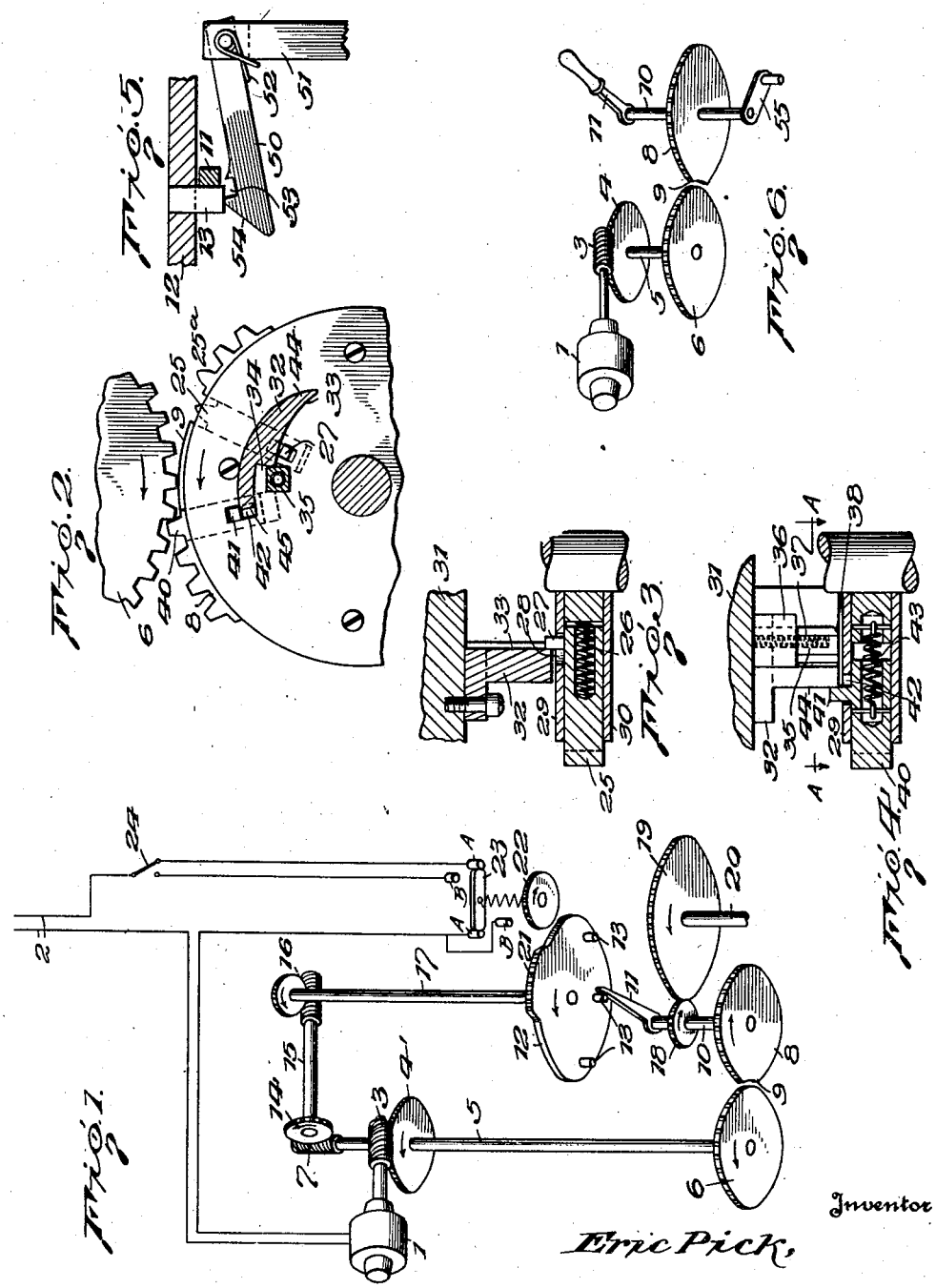
Inventor
*Eric Pick,*
By K. P. McElroy
Attorney Patented Nov. 28, 1933

1,937,326

UNITED STATES PATENT OFFICE 1,937,326

INTERMITTENT GEAR DRIVE AND MEANS OF CONTROLLING SAME

Eric Pick, New York, N. Y., assignor to The Permutit Company, New York, N. Y., a corporation of Delaware Application August 21, 1931. Serial No. 558,626

11 Claims. (Cl. 74—7)

This invention relates to an intermittent gear drive and means of controlling same; and it comprises a gear drive for transmission of power to machines and devices operated intermittently or in cycles of successive operations having a primary gear train connecting the machine with power means such as an electric motor and including a pair of intermeshable gears of which the driven member has one or more cut-out sections without teeth with radially slidable teeth on both sides of a cut-out section, said driven gear being provided with means independent of its driving gear for periodically rotating the driven gear and with cam operated means cooperating with the rotating means to effect engagement and disengagement of said sliding teeth with the driving gear while running, said rotating means being advantageously operated and timed by the motor through the medium of a secondary gear train and a timing member having, if desired, a member adapted to cut off the supply of power from the motor after predetermined intervals of operation; all as more fully hereinafter set forth and as claimed.

In intermittent transmission of power from motors to machines for purposes of operation and control, as a rule each special machine presents an individual problem. While in the prior art many proposals are found involving intermittent action for special purposes in a machine itself, these proposals fail to provide means generally useful in controlling intermittent transmission of power to machines and devices for regulated intermittent operation as a whole or for a cycle of diverse operations separated by regulated intervals of time. In particular, while cut-out or mutilated gears with slidable teeth are more or less common devices, prior proposals for their utilization have left much to be desired in overcoming the difficulties inherent in engaging and disengaging such gears while running and in throwing loads upon the running gears simultaneously with their engagement.

In the present invention, I provide in gear drives for connecting motors with intermittently operated machines simple and positive means for establishing and disestablishing the connection, said means being readily adaptable to automatic regulation of the time of the intermissions between operations of the machine and to coordination of the power transmission with a cycle of operations separated by predetermined time intervals. So doing, I overcome operating difficulties heretofore present in intermittent gear transmission of power and make such transmission economical in intermittent machine operation generally.

In a copending application, Serial No. 484,164, filed Sept. 24, 1930, I have described and claimed a base exchange water softening apparatus wherein a rotatable valve mechanism is turned through a complete revolution in a plurality of successive steps making connections for a cycle of reconditioning operations with return to softening; the intermittent turning of the valve mechanism being by means of a motor through the medium of a gear drive including a pair of gears adapted, by a cut-out section in the driven member and spring-actuated sliding teeth, to establish the power transmission with the motor running and disestablish it automatically after one revolution of the driven member; establishment of the driving connection being coordinated with the desired successive valve movements by means of a timing member also driven by the motor and operating an engaging lever operatively connected with the cut-out driven gear. The intermittent gear drive of my said copending application is useful generally in intermittent power transmission, especially in transmission of relatively light power loads. With certain improvements hereinafter described my gear drive is particularly advantageous for relatively heavy duty power transmission. Among the uses to which my invention is applicable may be mentioned the transmission of power under manual or automatic control to eccentric presses, intermittent feeding of chemicals in water treating systems under meter control, continuously repeated shifting of advertising displays and in general the transmission of mechanical power to machines operating with regulated intermissions.

In practice, my intermittent gear drive may be used in connection with a machine operated by an individual motor. It may also be used with a machine receiving power from a line shaft supplying mechanical power to a plurality of other machines. The connection of the power means to the gear drive may be by belt and pulley, chain and sprocket, worm gears or other known devices and the gear drive and its connections may provide any desired reduction or adjustment of speed. In the gear drive I place in convenient location a pair of intermeshable gears, the driven member of this pair of gears having a cut-out section without teeth and being thereby adapted to be stopped in its rotation whenever the driving member registers with the cut-out section. In the case of a driven gear having one cut out section, it is of course stopped after a full revolution of the driven gear by its driving gear. By design of the gear ratio of this pair of gears, and of the number of cut-out sections in the driven gear, adjustment is secured in the duration of rotation of the driven gear between intermissions and thus of the operating intervals of the machine to which power is transmitted.

For starting rotation of the driven gear while the driving gear is running, I provide means independent of the driving gear for turning the driven gear past its cut-out section and into mesh with the driving gear. The independent turning means may be manually operable, as by a lever or crank attached to the shaft of the driven gear with a suitable geared connection, if desired. Or the turning means may be operated by separate power means such as a secondary electric motor. I find it however in many cases advantageous to turn the driven gear into engagement by means of a timing member operated by the same power means as that primarily supplying the operating power but through the medium of a secondary gear train. The engaging and timing means may be a disc or wheel having projections such as pins thereon engaging a starting bar or lever attached to the shaft of the driven gear; the speed of rotation of the timing disc and the positions of the pins thereon being arranged to effect successive engagement of the pins with the starting lever at predetermined times. When desired in the case of machines or devices involving irregularly recurrent cycles of successive operations such for example as turning valves for reconditioning a base exchange water softener, the timing member or an element in its gear train may be arranged to automatically cut off the power supply from the operating motor and thus to stop all motion of the gear trains at the end of the operating cycle.

It is sometimes advantageous to lock the starting bar in order to prevent its movement in connection with chance movements of the operating device during intermission of operation which would disarrange the timing of the starting of the succeeding operations. Such locking with subsequent unlocking can be effected by attaching to the apparatus casing a latch formed with a notch fitting over the starting bar and held by a spring, the latch having also an inclined face adapted to permit its being pushed away from the starting bar by each of the timing pins as they in turn approach the starting bar upon rotation of the timing member. Instead of engaging the starting bar, the latch may be made to lock the cut-out gear by engaging a projection on the gear provided for locking purposes. Or the latch may carry a projection registering with a groove or slot in the cut-out gear.

To make intermittent engagement of the driven gear with its driving gear direct and positive without undue strains or wear and tear, the first tooth on the engaging side of the cut-out section of the driven gear is made slidable radially or retractable within the gear and is provided with a spring normally holding this slidable engaging tooth out and in position to mesh with the driving gear. The slidable tooth is also provided with a pin projecting through a slot in the side of the gear and limiting the sliding movement of the tooth; the driven gear cooperating with a stationary cam having one face adapted in relation with the gear while it is turning to act with the tooth projection to retract the engaging tooth against the pressure of its spring and to release the tooth when the gear is turned into engaging position. For heavy duty this cam may be provided with a spring latch adapted to hold the tooth by its projection against retraction after engagement or during the engaging action.

To prevent undue wear and tear of the two gears during disengagement, the first tooth on the disengaging side of the cut-out section of the driven gear may also be made slidable radially, retractable by a spring, and provided with a projection and limiting slot in the side of the gear, the stationary cam cooperating with the gear being provided with a second face adapted to engage the tooth projection and to hold the tooth outward while it is in mesh with the driving gear until it reaches the disengaging point and to release the tooth at the disengaging point to be retracted by its spring.

In the accompanying illustration, I have shown more or less diagrammatically apparatus within my invention. In this showing, Fig. 1 is a diagrammatical representation in elevation of a gear drive adapted to connect a motor to an operating machine and including a timing and switching mechanism operated by the same motor as that primarily supplying the operating power;

Fig. 2 is a detail in plan view, partly in section along the plane A—A of Fig. 4, of the cut-out gear of Fig. 1;

Fig. 3 is a detail in section of the engaging tooth of the cut-out gear of Fig. 2;

Fig. 4 is a detail in section of the disengaging tooth of the cut-out gear of Fig. 2;

Fig. 5 is a detail of a safety locking device for the engaging bar of Fig. 1; and Fig. 6 is an elevational view of a modification of the gear drive adapted to manual control.

Referring to the drawing, an electric motor 1 supplied with current by leads 2 drives by means of worm 3 a worm gear 4 which carries on its shaft 5 a gear 6 and also a worm 7. Gear 6 is the driving member of a pair of gears including a cut-out driven gear 8 having a cut-out section 9. Attached to the shaft 10 of the cut-out gear is a starting bar or lever 11 by means of which the cut-out gear 8 can be rotated into mesh with its driving gear 6. Bar 11 may be moved, as shown, by means of a timing member 12, which is shown as a disc with timing pins 13, adapted to successively engage the starting bar 11 upon rotation of the disc 12. The timing member 12, as shown, is rotated by the motor 1 through the medium of gear 14 meshing with worm 7, and of shaft 15, worm and gear 16, and shaft 17. The machine desired to be intermittently operated may be connected to the gear drive by gear 18 on the shaft 10, meshing with gear 19 on shaft 20, which may be taken to represent the drive shaft of the machine. When drive shaft 20 is connected to a mechanism operating in cycles of successive steps, the rate of rotation of timing gear 12 and the location of pins 13 may be arranged to adjust the intervals of time as desired between successive operations of shaft 20 so that the operations making up the cycle may take place at predetermined intervals. When irregularly recurrent cycles of operation are desired, the timing member 12 may be provided with a toothed section 21 adapted upon each rotation of disc 12 to engage gear 22 and thereby to throw a four-point switch 23 from contacts A—A to contacts B—B, or vice versa, this switch being connected in series with a starting switch 24, both switches being in the current leads 2 of motor 1. The switch 23, as diagrammatically shown in Fig. 1 represents a rotary snap switch of standard well-known design. The gear 22 is attached to the operating shaft of this switch in place of the button ordinarily provided for manual operation. Switch 24 may be of the same construction as switch 23 and adapted for manual or mechanical operation. As shown, the two switches are connected in series in motor circuit 2 and provide in the series connection means for alternating opening and closing of the motor circuit to stop and start the motor. When switch 24 is operated by a meter or by a time clock in known ways, both switches automatically cooperate in starting the motor at predetermined times and the stopping of the motor is effected by switch 23 independently of switch 24 but in such a way as to leave the circuit ready for closing by switch 24 which starts the motor without requiring manipulation of switch 23.

Figs. 2, 3 and 4 show details of construction of the cut-out gear 8. At the engaging end of the cut-out section 9 a slidable engaging tooth 25 is provided. This tooth is pressed outwardly by a compression spring 26, the sliding movement of the tooth being limited by means of projection 27 and slot 28 in a plate 29, which together with a plate 30 holds the tooth in place. In proximity to gear 8, advantageously on a gear box 31, stationary cam 32 is arranged to engage with its face 33 the projection 27 as the gear is turned into engagement with its driving member and thus to hold tooth 25 retracted in the gear as it approaches the engaging point; cam 32 being recessed at 34 so that projection 27 slips into this recess and allows tooth 25 to be pressed outwardly by its spring 26 and to engage with gear 6. Engagement of the tooth is facilitated by the pointed shape of tooth 25, as shown. If tooth 25 should meet head-on with a tooth of gear 6 it slips over the face of this tooth and then comes into mesh with the following tooth of gear 6. It is sometimes advantageous to likewise point tooth 25a adjacent to the tooth 25.

In cases involving high loads of power transmission, any radial inward force against tooth 25 is counteracted by means of a latch 35 which is slidably mounted in a guide 36 forming part of cam 32. This latch is pressed downwardly by compression spring 37 placed in the center of the latch which is made hollow for the purpose. The latch has an inclined lower face 38 adapted to allow projection 27 to lift the latch as the gear is rotated by arm 11 into engaging position. As soon as the projection 27 snaps into the recess 34, the latch 35 is pressed downwardly by the spring 37 and thereby prevents inward movement of the engaging tooth 25. By the time gear 8 has been turned further, so that the projection 27 moves away from the latch 35, the following tooth 25a becomes engaged and carries the load.

It is in most cases advantageous to have the first tooth next the disengaging end of the cut-out section 9 also slidable radially of the gear. So doing, a slidable disengaging tooth 40 is provided with a projection 41 serving in conjunction with slot 42 in plate 29 to limit the sliding movement. The tooth is provided with tension spring 43 acting to hold the tooth 40 retracted. To hold the tooth in mesh with gear 6 as the gears 6 and 8 approach their disengaging point, cam 32 is provided with a face 44 which engages the projection 41 and holds tooth 40 outward until the projection 41 reaches the edge 45 of the cam, whereupon the tension of spring 43 pulls tooth 40 positively out of mesh with gear 6, thereby stopping gear 8 without any cutting action upon tooth 40 by the moving teeth of gear 6.

In some cases the nature of the operation of the machine to which drive shaft 20 is connected might tend to cause turning of the shaft 10 during an intermission of operation and thereby to cause premature engagement of gears 8 and 6. This can be prevented by a safety latch 50 as shown in Fig. 5. Latch 50 is pivotally supported on an arm 51 which may be attached to a casing surrounding the gears. On the pivotal support of latch 50 a spring 52 is provided which presses the latch normally by means of notch 53 into engagement with arm 11. This engagement is effected when arm 11 comes to rest at the end of each revolution of gear 8. When upon rotation of timing disc 12 one of the timing pins 13 approaches the starting bar 11, the pin 13 first presses against an inclined surface 54 provided on the safety latch and thereby disengages it from the bar 11 against the action of spring 52, whereupon bar 11 is free to be turned by pin 13. By this means bar 11 may be made operable only by the timing pins 13, but not by any other force or reaction.

The gear drive is particularly adapted to automatic operation of a rotating valve mechanism making a sequence of different connections such as is required in controlling various reconditioning liquid flows in base exchange water softeners, water filters and the like; the valve mechanism being connected to the drive shaft 20.

The gear drive may also be extremely useful for other purposes. For example, in the arrangement shown in Fig. 6, starting bar 11 may be operated manually to throw gear 8 into engagement with gear 6 and thus to control an eccentric 55 operating an eccentric press.

The gear drive can be employed in chemical feeding devices applied to lime-soda softeners or the like with timing disc 12 operated by a meter. In such a case, whenever a predetermined quantity of water has passed through the meter the starting arm 11 would be actuated to throw gear 8 into mesh, drive shaft 20 thereupon causing a certain and predetermined amount of chemical to be added to the water, as by emptying a bucket.

With timing member 12 operated by a source of power, such as electric motor 1 but without the use of switch 23, a cycle of operations can be regularly repeated. With such an arrangement the gear drive can be used for such purposes as producing periodic changes in advertising displays, for control of valves in blow-and-run water gas producers, etc., etc.

When exactly accurate timing is required, the motor operating the timing member 12 may be a constant speed electric motor.

What I claim is:—

1. In a gear drive for intermittent transmission of power, a pair of intermeshable gears, the driving member of said pair being connected for rotation by power means and the driven member having a cut-out section without teeth, the first tooth on the engaging side of said cut-out section being radially slidable in said driven gear and being provided with a spring pressing the tooth radially outward, means for periodically turning the driven gear into mesh with the driving gear and stationary means cooperating with said turning means for retracting the slidable tooth before it reaches its enmeshing point, said stationary cooperating means being adapted to release the tooth when it reaches its enmeshing point.

2. In a gear drive for intermittent transmission of power, a pair of intermeshable gears, the driving member of said pair being connected for rotation by power means and the driven member having a cut-out section without teeth, the first tooth on the engaging side of said cut-out section being radially slidable in said driven gear and being provided with a spring pressing the tooth radially outward, a starting bar operatively connected to said driven gear, a rotary timing member adapted to periodically engage with the starting bar to turn the driven gear into mesh with its driving gear while the latter is in motion and means actuated by the turning movement of the driven gear for retracting and subsequently releasing said slidable tooth.

3. In a gear drive for intermittent transmission of power, a pair of intermeshing gears, the driving member of said pair being connected for rotation by power means and the driven member having a cut-out section without teeth, the first tooth on the engaging side of said cut-out section being radially slidable in said driven gear and being provided with a spring pressing the tooth radially outward, means independent of the driving gear for periodically turning the driven gear into mesh with the driving gear, a slot in the side of the driven gear and a projection on the sliding tooth projecting through said slot, a gear case for said driven gear and attached to the gear case a cam having a face adapted upon said turning of the driven gear to engage with said tooth projection to temporarily retract the tooth.

4. In a gear drive for intermittent transmission of power, a pair of intermeshable gears, the driving member of said pair being connected for rotation by power means and the driven member having a cut-out section without teeth, the first tooth on the engaging side of said cut-out section being radially slidable in said driven gear and being provided with a spring pressing the tooth radially outward, means for periodically turning the driven gear into mesh with the driving gear, means cooperating with said turning means for retracting the slidable tooth before it reaches its enmeshing point, said cooperating means being adapted to release the tooth when it reaches its enmeshing point, and means for locking the tooth against radially inward movement during its enmeshment.

5. In a gear drive for intermittent transmission of power, a pair of intermeshable gears, the driving member of said pair being connected for rotation by power means and the driven member having a cut-out section without teeth, the first tooth on the engaging side of said cut-out section being radially slidable in said driven gear and being provided with a spring pressing the tooth radially outward, means for periodically turning the driven gear into mesh with the driving gear, a slot in the side of the driven gear and a projection on the sliding tooth projecting through said slot, a gear case for said driven gear and attached to the gear case a cam having a face adapted upon said turning of the driven gear to engage with said tooth projection to temporarily retract and to release the tooth, said cam being provided with a spring actuated latch holding the tooth in mesh.

6. In means for intermittent power transmission, a gear train operable by power means, a pair of intermeshable gears in said gear train with its driven member having a cut-out section without teeth, an engaging bar operatively connected with said driven gear, a separate rotatable timing member having projections spaced apart thereon and adapted to successively engage and disengage said engaging bar to cause intermeshing of the gears at intervals determined by the spacing of said projections and power means adapted to rotate said rotatable member at a speed different from that at which said pair of gears is operable.

7. Means for intermittent power transmission comprising an electric motor, a speed reducing gear train connected with the motor, a pair of intermeshable gears in said gear train with its driven member having a cut-out section without teeth, an engaging bar operatively connected to said cut-out gear, a rotatable timing member having projections spaced apart thereon and adapted to successively engage and disengage said bar to cause intermeshing of the gears at intervals determined by the spacing of said projections, a second speed reducing gear train connecting the rotatable timing member to the electric motor, a switch in circuit with the motor and means operatively associated with the timing member for opening the switch.

8. In mutilated gearing comprising a driving gear and a cut-out driven gear, a radially slidable tooth immediately next to the disengaging side of a cut-out section of the driven gear said slidable disengaging tooth being provided with a spring pressing said tooth radially inward out of engagement with the driving gear and with means actuated by the rotation of the driven gear for holding the tooth in mesh with the driving gear before the tooth reaches its disengaging point, said means being adapted to release the tooth to be quickly retracted by its spring when the disengaging point is reached.

9. In mutilated gearing comprising a driving gear and a cut-out driven gear, a radially slidable tooth immediately next to the disengaging side of a cut-out section of the driven gear, said slidable disengaging tooth being provided with a spring pressing said tooth radially inward out of engagement with the driving gear, a projection on said tooth projecting through a slot in the side of the gear and a stationary cam adapted to engage said projection as the tooth approaches the disengaging point upon rotation of the gears, said cam having a face adapted to hold the tooth in mesh with the driving gear and to release it to be quickly retracted by the spring when the disengaging point is reached.

10. A gear drive comprising a pair of intermeshing gears, the driven gear having a cut-out section without teeth and two radially slidable retractable teeth next the respective ends of the cut-out section, the two slidable teeth having projections extending through slots in the side of the gear and being provided with springs pressing the teeth respectively inwardly and outwardly, a stationary cam adjacent the driven gear and having two faces adapted to engage the respective tooth projections and thereby to hold the teeth respectively unretracted and retracted against the pressures of their springs as the teeth approach their points of enmeshment with the driving gear, said cam faces being also adapted to release the tooth projections when the respective enmeshment points are reached, and means for rotating the driven gear from its disengaged position into engagement with the driving gear when in motion.

11. In mutilated gearing, a driving gear adjacent to a driven cut-out gear having a disengaging tooth slidable radially of the gear, a spring retracting the tooth and means effective upon rotation of the gear for holding said disengaging tooth in mesh against the pressure of its spring, said holding means being adapted to release the tooth while it is in mesh with the driving gear, said release causing quick retraction of the tooth by the spring.

ERIC PICK.